March 12, 1957 T. D. JOHNSON ET AL 2,785,306
LEAD NETWORK FOR SERVO-MECHANISMS WITH A. C. CARRIER VOLTAGE
Filed Feb. 3, 1953
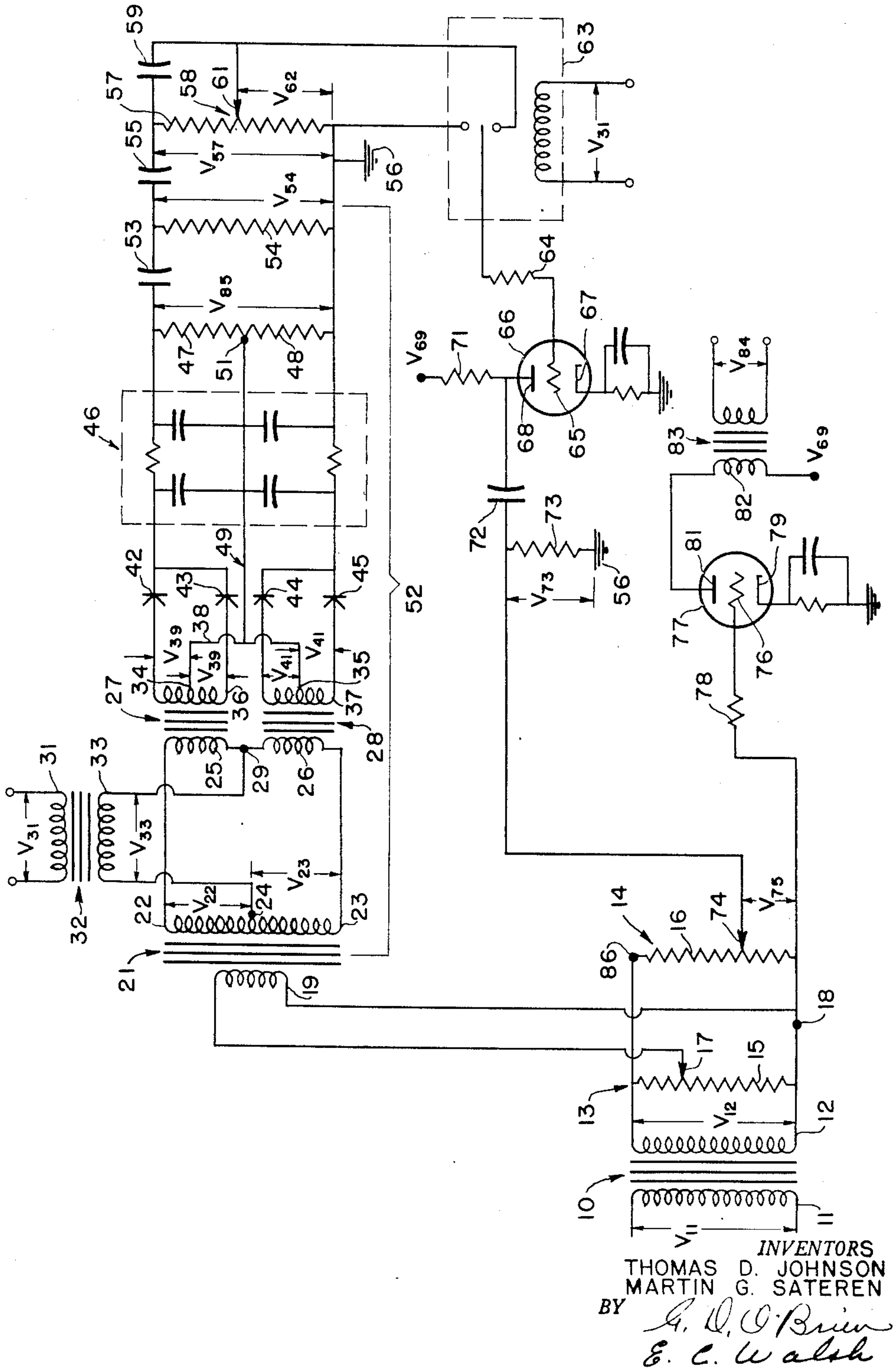
INVENTORS
THOMAS D. JOHNSON
MARTIN G. SATEREN
BY G. D. O'Brien
E. C. Walsh
ATTORNEYS United States Patent Office 2,785,306

Patented Mar. 12, 1957

2,785,306

LEAD NETWORK FOR SERVO-MECHANISMS WITH A. C. CARRIER VOLTAGE

Thomas D. Johnson, Euclid, Ohio, and Martin G. Sateren, Farrell, Pa., assignors, by mesne assignments, to the United States of America as represented by the Secretary of the Navy Application February 3, 1953, Serial No. 334,813

1 Claim. (Cl. 250—27)

The invention described herein may be manufactured and used by or for the Government of the United States of America for governmental purposes without the payment of any royalties thereon or therefor.

This invention relates generally to control systems, and more particularly to an electronic circuit for obtaining lead control in A. C. carrier servo-mechanisms.

Servo-mechanisms with which this invention is to be used produce an A. C. error signal which is amplitude modulated. This error signal can be resolved into three frequencies, a carrier frequency and its two side band frequencies, the frequencies of which are equal to the carrier frequency plus or minus a modulating frequency. The modulating frequency is the frequency with which the error between the input and the output of the servo-mechanism occurs. The modulating frequency will be referred to subsequently as the error frequency. The amplitude of the error signal is a function of the magnitude of the error between the input and the output of the servo-mechanism. The phase relationship between the error signal and a reference signal of the same frequency as the carrier frequency of the error signal indicates the direction of the error.

It is common in control systems of this type to combine with the error signal an additional signal whose amplitude and phase is such as to prevent hunting or oscillation in the control system. It has been proposed in the past to combine with the error signal a signal which is a function of the first time derivative of the error. Other control systems have used the combination with the error signal of the second derivative thereof in order to prevent undesired oscillations or hunting.

It is an objective of this invention to provide an improved lead network which provides electronic means for obtaining a first A. C. voltage, or signal, which is a function of the first time derivative of the error between the input and output of a servo-mechanism, and a second A. C. voltage, or signal, which is a function of the second time derivative of said error, and to combine or add these voltages with a third A. C. voltage, the error signal, which voltage is a function of said error, whereby a lead-modified error voltage is obtained which can be used by the servo-mechanism to eliminate the error between its input and output rapidly while preventing undesired oscillation.

Another objective of this invention is to provide a circuit whereby the amplitudes of the error signal and the signals which are functions of the first and second time derivatives of the error signal may be varied prior to their being combined or added.

Still another object of this invention is to provide a lead network which is simple, reliable and stable over a wide range of error frequencies.

A further object of this invention is to provide a lead network which permits accurate control over an unusually wide range of servo-mechanism errors.

Other objects and many of the attendant advantages of this invention will be readily appreciated as the same becomes better understood by reference to the following detailed description when considered in connection with the accompanying drawing wherein the single figure is a schematic wiring diagram illustrating an embodiment of the novel lead control network of this invention.

Referring now to the drawing wherein like reference characters designate like or corresponding parts, there is shown at 10 a transformer having primary and secondary coils 11 and 12. Voltage $V_{11}$, an error signal obtained from a conventional error sensing device, such as a synchro control transformer (not shown), is applied across coil 11. Such an error signal, often conveniently termed a suppressed carrier modulated signal, may have a carrier frequency of say 400 cycles/sec., and is either in phase or in phase-opposition to a reference signal (at carrier frequency) in accordance with the sense or direction of the displacement from which the error signal is derived. The error signal further exhibits envelope modulation (amplitude modulation) at the error frequency of say 1/5 to 5 cycles/sec., the envelope amplitude corresponding at all times to the error amplitude. Voltage $V_{12}$ is induced in coil 12 by the electric current flowing in coil 11. Potentiometers 13 and 14 are connected in parallel, and voltage $V_{12}$ is applied across resistors 15 and 16 of potentiometers 13 and 14, respectively. Tap 17 of potentiometer 13 is in adjustable contact with resistor 15. The voltage developed across that portion of resistor 15 between tap 17 and point 18 is applied to primary coil 19 of transformer 21. The secondary of transformer 21, consisting of two coils 22 and 23 of equal impedance and connected in series, is provided with a center tap 24. The secondary of transformer 21 is connected in series with the primary coils 25 and 26 of transformers 27 and 28, respectively. Coils 25 and 26 are of equal impedance and have a tap 29 located between them. A reference voltage $V_{31}$ of the same frequency as the carrier frequency of the error signal is applied to primary coil 31 of transformer 32. The output voltage $V_{33}$ of the secondary coil 33 of the transformer 32 is applied to taps 24 and 29. The mid-points 34 and 35 of coils 36 and 37, the secondaries of transformers 27 and 28, respectively, are connected by lead 38. The voltages $V_{39}$ and $V_{41}$ developed between the ends of coils 36 and 37 and their mid-points 34 and 35 are rectified by elements 42, 43, 44, and 45, which may be either conventional thermionic diodes or suitable crystals. The rectified potentials are filtered by filtering network 46 and then applied across equal resistors 47 and 48. Common lead 49 connects lead 38 with the junction point 51 of resistors 47 and 48 and provides a D. C. component of the return path. Condenser 53 blocks the D. C. voltage developed across resistors 47 and 48, passing to resistor 54 only the modulation voltage at the relatively low error frequency. The circuit from transformer 21 to resistor 54, and indicated by a bracket, constitutes a demodulator, or a phase sensitive detector, 52.

One end of resistor 54 is connected between condensers 53 and 55 while the other end is connected to ground 56. Condenser 55 together with resistor element 57 of potentiometer 58 comprise a first time differentiating circuit for obtaining voltage $V_{57}$, the first time derivative of voltage $V_{54}$, the voltage across resistor 54. Condenser 59, and that portion of resistor 57 between ground 56 and tap 61 of potentiometer 58, comprise a second differentiating network for obtaining the first time derivative of voltage $V_{57}$, thus yielding the second time derivative of voltage $V_{54}$. Voltage $V_{62}$, developed between tap 61 of potentiometer 58 and ground 56, is modulated at the frequency of the reference signal $V_{31}$ by a conventional chopper device shown symbolically at 63. The output of the chopper is applied through resistor 64 to the grid 65 of an amplifying thermionic tube 66. Tube 66 comprises a cathode 67 and a plate 68 in addition to grid 65. Plate voltage $V_{69}$ is applied to the plate 68 by means of a resistor 71. The amplified output is capacitively coupled by condenser 72 to resistor 73 which is grounded at 56. The potential developed across resistor 73, voltage $V_{73}$, is connected to tap 74 of potentiometer 14. Voltage $V_{75}$, developed between tap 74 and point 18, is thus summed with voltage $V_{73}$, as is applied to the grid 76 of thermionic tube 77 through resistor 78. The tube 77 also comprises a cathode 79 and a plate 81. Plate voltage $V_{69}$ is applied through coil 82 of a transformer 83 to plate 81. The output voltage $V_{84}$ across secondary coil 84 of transformer 83 is thus at a level suitable to drive a conventional servo motor (not illustrated).

Error signal or voltage $V_{11}$ comprises a constant amplitude signal, for example at 400 cycles/sec., suppressed carrier modulated in accordance with the error at varying amplitude and frequency in the range of from ⅕ to 5 cycles/sec. Voltage $V_{11}$ is applied across the primary coil 11 of transformer 10. Voltage $V_{12}$ is developed across the secondary coil 12 of transformer 10 and is applied across potentiometers 13 and 14. A portion of voltage $V_{12}$, depending upon the location of tap 17, is applied across the primary coil 19 of transformer 21. The current flowing through coil 19 develops equal voltages $V_{22}$ and $V_{23}$ across coils 22 and 23 in the secondary of transformer 21. Since coils 22, 23, 25 and 26 are connected in series, the currents produced by the voltages $V_{22}$ and $V_{23}$ will cause current to flow through coils 25 and 26 and induce voltages in coils 36 and 37 which are inductively coupled with coils 25 and 26.

Reference voltage $V_{31}$ which is either in phase or 180° out of phase with the carrier frequency of the error signal, depending upon the direction of the error between the input and output of the servo-mechanism, is applied to the primary coil 31 of transformer 32. Voltage $V_{31}$ induces voltage $V_{33}$ in the secondary coil 33 of transformer 32, and voltage $V_{33}$ is applied between taps 24 and 29.

The current produced by the application of voltage $V_{33}$ to the circuit flows equally through each half of the circuit, namely, half of the current flows through coils 22 and 25 while the other half flows through coils 23 and 26. Because of the arrangement, no voltage is induced in coil 19 by the currents produced by voltage $V_{33}$ flowing in coils 22 and 23.

In order for detector 52 to determine whether or not error signal $V_{11}$ is in phase with reference voltage $V_{31}$ or 180° out of phase, it is necessary that voltage $V_{33}$ be equal to or greater in magnitude than voltages $V_{22}$ and $V_{23}$. Adjustment of tap 17 of potentiometer 13 is therefore made to reduce the maximum magnitude of voltages $V_{22}$ and $V_{23}$ to obtain this condition.

Assuming that the voltages $V_{22}$ and $V_{23}$ are in phase with voltage $V_{33}$, it can be seen that the currents, due to voltages $V_{22}$ and $V_{23}$, will add with the current due to voltage $V_{33}$ in coil 25, for example, while they oppose one another in coil 26. A 180° phase shift between voltage $V_{22}$ and $V_{23}$ will cause the currents to add in coil 26 while they oppose one another in coil 25.

The voltage $V_{39}$, developed between the ends of coil 36 and its mid point 34, and voltage $V_{41}$, developed between the ends of coil 37 and its mid point 35, are rectified by the full wave rectifier circuits and filtered by filtering network 46. The outputs from the filters are applied across resistors 47 and 48. Common lead 49 provides a D. C. return path.

The phase relation between the error signal $V_{11}$ and the reference voltage $V_{31}$ determines whether voltage $V_{39}$ is greater or less than voltage $V_{41}$. The circuit can be arranged so that if voltage $V_{39}$ is greater than voltage $V_{41}$, the error signal $V_{11}$ and the reference signal $V_{31}$ are in phase. If voltage $V_{41}$ is greater than voltage $V_{39}$ then the error signal $V_{11}$ and the reference signal $V_{31}$ are 180° out of phase.

The circuits are so arranged that voltages across resistors 47 and 48 are always positive with respect to common lead 49. Since the end of resistor 48 remote from point 51 is grounded at 56, the resultant voltage $V_{85}$ across resistors 47 and 48 will be positive or negative depending upon whether voltage $V_{39}$ is greater or smaller than voltage $V_{41}$. If voltages $V_{39}$ and $V_{41}$ are equal, because of zero error, then voltage $V_{85}$ will be equal to zero. Voltage $V_{85}$ is a very low frequency A. C. voltage, the magnitude of which at each instant is a function of the error between the input and output of the servo-mechanism, and the polarity of which at each instant indicates the direction of the error and the frequency of which is the frequency of the error.

Condenser 53 blocks the D. C. component of voltage $V_{85}$ from condenser 55 and prevents leakage currents through condenser 55, thus eliminating undesired voltages across potentiometer 58. Condenser 53 is large enough so that it will not attenuate the A. C. component at error frequency of the voltage $V_{85}$. Voltage $V_{54}$ is an A. C. voltage whose frequency is the error frequency, whose amplitude is a function of the magnitude of the error and whose polarity indicates the direction of the error. Voltage $V_{54}$ is appled to a first differentiating network comprising condenser 55 and resistor 57 of potentiometer 58. The voltage $V_{57}$ existing across resistor 57 is a function of the first time derivative of voltage $V_{54}$ and thus of the error between the input and output of the servo-mechanism. Voltage $V_{57}$ is then applied to the second differentiating network comprising condenser 59 and that portion of resistor 57 between ground 56 and tap 61. Voltage $V_{62}$ existing across that portion of resistor 57 between tap 61 and ground is the sum of the voltages obtained by the aforementioned second time differentiating network and a portion of voltage $V_{57}$. The portions of each voltage are varied by adjusting the location of tap 61.

Voltage $V_{62}$ is thus an A. C. signal of error frequency whose amplitude and phase angle are determined by the sum of two voltages which correspond, respectively, to the first and second time derivatives of the error between the input and output of the servo-mechanism. Voltage $V_{62}$ leads the error by a phase angle determined by the constants of the differentiating networks. Voltage $V_{62}$ is then modulated by the chopper 63 at the frequency of reference signal $V_{31}$ and applied to the grid of tube 66 connected in a conventional amplifying circuit. Voltage $V_{73}$ developed across resistor 73, is thus a suppressed carrier modulated lead voltage having the same carrier frequency as that of the error signal, and of phase and amplitude corresponding to the sum of the first and second time derivatives of the error between the input and output of the servo-mechanism.

Voltage $V_{73}$ is then added to that portion of voltage $V_{12}$ existing between tap 74 and point 18 and the resultant sum voltage is amplified by the amplifying circuit including tube 77. Adjustment of tap 74 permits the proportion of voltage $V_{12}$ that is to be added to voltage $V_{73}$ to be varied to obtain optimum results. The low impedance between tap 74 and point 18 together with the high impedance between tap 74 and point 86 effectively prevents voltage $V_{73}$ from coupling back and appearing across coil 19.

Output voltage $V_{84}$ is thus the sum of three A. C. voltages, one of which is a function of the error between the input and output of the servo-mechanism, the second of which is a function of the first time derivative of the error, and the third of which is a function of the second time derivative of the error. The amplitudes of each voltage may be varied by the use of the potentiometers, as pointed out above, to obtain as an output, voltage $V_{84}$, that is, a lead-modified voltage that will permit accurate control of a servo-mechanism to be maintained over an unusually wide range of servo-mechanism errors.

Obviously many modifications and variations of the present invention are possible in the light of the above teachings. It is therefore to be understood that within the scope of the appended claims the invention may be practiced otherwise than as specifically described.

What is claimed is:

In a servo system having means energized by a reference signal of predetermined carrier frequency and operating to provide an error signal of suppressed carrier modulated type in response to a displacement error, an improved lead network for modifying the servo system error signal, said lead network comprising phase-sensitive detector means for isolating the modulation signal component of said error signal, means for obtaining first and second signals as direct functions, respectively, of the first and second time-derivatives of said modulation signal, means for summing said first and second signals in adjustable ratio of magnitudes, chopper means adapted to convert direct voltage input to alternating voltage output for remodulating the summed signals to the carrier frequency of said error signal and in predetermined phase relationship to said reference signal, and means for combining the remodulated summed signals and said error signal in adjustable ratio of magnitudes to provide a lead-modified error signal at said carrier frequency.

References Cited in the file of this patent

UNITED STATES PATENTS

| | | |
|---|---|---|
| 2,233,415 | Hull | Mar. 4, 1941 |
| 2,446,567 | White | Aug. 10, 1948 |
| 2,524,053 | Halpert | Oct. 3, 1950 |
| 2,589,133 | Purington | Mar. 11, 1952 |